UNITED STATES PATENT OFFICE.

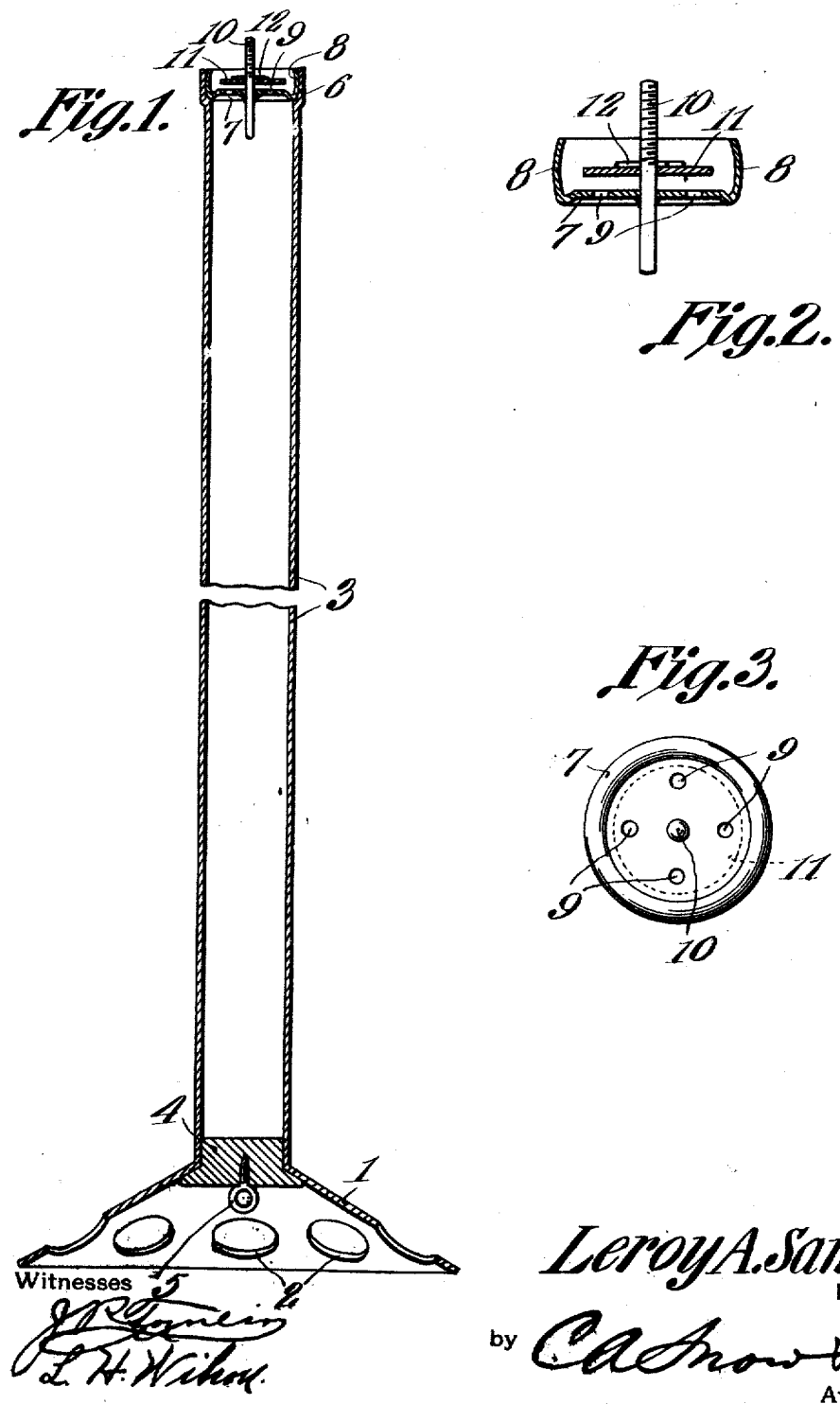

LEROY A. SANDOE, OF HOPE, ARKANSAS.

CHURN-DASHER.

1,012,448.  Specification of Letters Patent.  Patented Dec. 19, 1911.

Application filed April 6, 1911.  Serial No. 619,353.

*To all whom it may concern:*

Be it known that I, LEROY A. SANDOE, a citizen of the United States, residing at Hope, in the county of Hempstead and State of Arkansas, have invented a new and useful Churn-Dasher, of which the following is a specification.

This invention relates to churn dashers of that type disclosed in Patent No. 978,653, issued to me on December 13, 1910.

The object of the invention is to provide a dasher the handle of which constitutes a liquid container whereby either hot or cold water may be held for the purpose of changing the temperature of the cream being worked, there being means used in connection with said handle and whereby air can be forced into the cream during the down strokes of the dasher or, if desired, a suction force can be created on the up strokes of the dasher.

With the foregoing and other objects in view which will appear as the description proceeds the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings the preferred form of the invention has been shown.

In said drawings:—Figure 1 is a central longitudinal section through the dasher. Fig. 2 is an enlarged section through the valve and its casing. Fig. 3 is a bottom plan view of the structure shown in Fig. 2.

Referring to the figures by characters of reference 1 designates a substantially hollow conical dasher having openings 2 formed therein and projecting from the center of this dasher is an elongated tubular handle 3 the lower end of which may be closed by a plug 4, this plug, however, being readily removable, there being an eye 5 extending from one face thereof and which constitutes means whereby the removal of the plug is facilitated. The upper end of the handle 3 is preferably enlarged, at 6, to form a seat for a valve casing 7. This casing is substantially bowl-shaped and the wall thereof is bulged outwardly, as indicated at 8 while a series of openings 9 are formed in the bottom of the casing. A stem 10 extends through and is secured to the center of the bottom of the casing, this stem being perpendicular to the bottom and constituting a guide for a disk valve 11, any suitable means, such as a cotter pin 12, being provided for holding the disk against displacement relative to the stem. As shown in the drawings the stem projects above and below the casing so as to be easily grasped. Casing 8 is designed to be forced into the enlarged portion 6 of the handle 3 and is held firmly seated within the enlargement by reason of its frictional engagement with the same.

When it is desired to change the temperature of the contents of the churn in which the dasher is to be worked, the tubular handle 3 is closed at its lower end by the plug 4 and said handle is then partly or entirely filled with either hot or cold water and, when the dasher is moved downwardly into the contents of the churn, it will be apparent that the said contents will be heated or chilled by the handle 3, according to the temperature of the water contained within the handle.

Should it be desired to utilize the dasher for the purpose of forcing air into the cream, the contents of said handle are removed and plug 4 is withdrawn. The valve casing is then removed from the position shown in Fig. 1 and inverted and then reinserted into the enlargement 6 of the handle, it being apparent that the valve 11 will thus be supported under the openings 9. During the down stroke of the dasher air contained within the handle 3 will be prevented from escaping upwardly because disk 11 will be seated upon the apertured portion of its casing. The air will therefore be forced downwardly into the cream. During the up stroke of the dasher additional air may be drawn into the handle through the openings 9, the valve disk 11 moving downwardly from the openings.

Should it be desired to create a suction force through the handle 3 during the up strokes of the dasher, the valve casing should be arranged as shown in Fig. 1. With the casing thus arranged disk 11 is normally seated on the apertured bottom of the casing and, during the down stroke of the dasher air contained within the handle 3 will be forced upwardly through the openings 9, thus unseating the disk whereas, during the up strokes of the dasher, the disk 11 will be seated and prevent air from entering the handle through the openings 9.

It will be seen that the valve casing is readily reversible so as to cause the valve to act in the manner desired and, as before stated, the handle 3 can be furthermore utilized as a means for heating or cooling the cream simply by inserting plug 4 into the lower portion of the handle and then filling said handle with water of the desired temperature.

What is claimed is:—

1. A churn dasher including a hollow head, a tubular handle extending therefrom and communicating therewith, and means for closing the lower end of the handle, said handle constituting a water container.

2. A churn dasher including a hollow head, a tubular handle extending therefrom, a valve casing detachably seated in one end of the handle, said casing having openings, a stem extending through the center of and fixed relative to the casing, and a disk valve slidably mounted on the stem and adapted to close the opening.

3. A churn dasher including a hollow head, a tubular handle extending therefrom, said handle having a seat, a reversible valve casing frictionally engaging the handle and detachably mounted on the seat, said casing having an opening, and a disk valve movably mounted in the casing for closing said opening.

4. A churn dasher including a hollow body, a tubular handle extending therefrom and having a seat, a reversible valve casing detachably mounted within said enlarged portion and having a bulged wall for frictionally engaging the handle, a stem within and fixed relative to the casing, said stem extending beyond opposite portions of the casing, and a disk valve slidably engaging the stem, said casing having an opening adapted to be closed by the valve.

5. A churn dasher including a hollow body, a tubular handle extending therefrom and having a seat, a reversible valve casing detachably mounted within said enlarged portion and having a bulged wall for frictionally engaging the handle, a stem within and fixed relative to the casing, said stem extending beyond opposite portions of the casing, and a disk valve slidably engaging the stem, said casing having an opening adapted to be closed by the valve, and means for closing the other end of the handle.

In testimony that I claim the foregoing as my own, I have hereto affixed my signature in the presence of two witnesses.

LEROY A. SANDOE.

Witnesses:
W. M. CANTLEY,
W. E. BRIANT.